United States Patent [19]

Moens et al.

[11] Patent Number: 5,397,641
[45] Date of Patent: Mar. 14, 1995

[54] THERMOSETTING POWDER COMPOSITIONS BASED ON POLYESTERS AND ACRYLIC COPLOYMERS

[75] Inventors: Luc Moens, Sint-Genesius-Rode; Daniel Maetens, Brussels; Jean-Luc Dallons, Sint-Pieters-Leeuw; Jean-Marie Loutz, Brussels, all of Belgium

[73] Assignee: U C B S.A., Brussels, Belgium

[21] Appl. No.: 207,089

[22] Filed: Mar. 8, 1994

[30] Foreign Application Priority Data

Mar. 11, 1993 [GB] United Kingdom ............... 9304940

[51] Int. Cl.$^6$ .................. B32B 19/00; C08F 20/00
[52] U.S. Cl. .................................. 428/357; 528/272; 528/296; 528/302; 528/303; 528/306; 528/307; 528/308; 528/308.6; 528/10; 528/33; 528/34; 528/35; 528/36; 528/41; 528/438; 528/445; 427/372.2; 427/386; 427/421
[58] Field of Search ............... 528/272, 296, 302, 303, 528/306, 307, 308, 308.6; 525/438, 445, 10, 33, 34, 35, 36, 41; 427/421, 372.2, 386; 428/357

[56] References Cited

U.S. PATENT DOCUMENTS

| | | | |
|---|---|---|---|
| 3,880,946 | 4/1975 | Labana et al. | 525/176 |
| 4,085,159 | 4/1978 | Marsiat | 525/438 |
| 4,499,239 | 2/1985 | Murakami et al. | 525/111 |
| 5,098,953 | 3/1992 | Ohmae et al. | 525/176 |
| 5,153,252 | 10/1992 | Skora | 524/372 |
| 5,326,821 | 7/1994 | Sasaki et al. | 525/124 |

FOREIGN PATENT DOCUMENTS 0522648  1/1993  European Pat. Off.

*Primary Examiner*—Samuel A. Acquah
*Attorney, Agent, or Firm*—Wenderoth, Lind & Ponack

[57] ABSTRACT

A thermosetting powder composition which comprises (a) a specific a carboxyl-terminated polyester and (b) a glycidyl group-containing acrylic copolymer. The carboxyl-terminated polyester (a) has an acid number of 15 to 70 mg of KOH/g and must be prepared in two steps. In the first step, a hydroxyl-terminated polyester is prepared from at least one polycarboxylic acid other than 1,4-cyclohexanedicarboxylic acid, and at least one aliphatic or cycloaliphatic polyol and in the second step, the resulting hydroxyl-terminated polyester is esterified with 1,4-cyclohexanedicarboxylic acid exclusively. In addition, the composition of the polyester (a) is very specific: it contains at least 75 mole % of terephthalic acid, at least 10 mole % of 1,4-cyclohexanedicarboxylic acid and at most 14 mole % of at least one other aromatic and/or aliphatic and/or cycloatiphatic polycarboxylic acid, based on a total carboxylic acid content of 100 mole %. The thermosetting powder compositions obtained from polyester (a) and acrylic copolymer (b) are particularly useful to prepare powder paints and varnishes; they produce coatings with a high gloss, excellent mechanical properties, and at the same time, good weatherability.

17 Claims, No Drawings

THERMOSETTING POWDER COMPOSITIONS BASED ON POLYESTERS AND ACRYLIC COPLOYMERS

The present invention relates to thermosetting powder compositions comprising as binder a mixture of a carboxyl-terminated polyester and of a glycidyl group-containing acrylic copolymer, and more particularly to thermosetting powder compositions which give coatings with excellent mechanical properties and remarkable weatherability.

The invention also relates to the use of said compositions for the preparation of powdered paints and varnishes from these compositions.

Thermosetting powder compositions are well known in the art and are widely used as paints and varnishes for coating the most various articles. The advantages of these powders are numerous; on the one hand, the problems associated with solvents are completely eliminated, and on the other hand, the powders are used without any loss since only the powder in direct contact with the substrate is retained on the article, the excess powder being, in principle, entirely recoverable and reusable. For these and other reasons, these powder coating compositions are preferred to coating compositions in the form of solutions in organic solvents.

Thermosetting powder compositions have already been widely used in the coating of domestic electrical appliances, automobile industry accessories, and the like. They generally contain a thermosetting organic binder, fillers, pigments, catalysts and various additives used to adapt their properties to their intended use.

There are various types of thermosetting powder compositions. The best known compositions contain as binder either a mixture of carboxyl group-containing polymers, such as a carboxyl group-containing polyester or polyacrylate, and epoxy compounds, such as triglycidyl isocyanurate, gtycidyl group-containing acrylic copolymers or β-hydroxyalkylamides or a mixture of hydroxyl group-containing polymers, most often a hydroxyl group-containing polyester, with blocked or non-blocked isocyanates, melamine resins, and the like.

The carboxyl group-containing polyesters suitable for use in the preparation of powdered varnishes and paints have already been described in numerous publications such as articles and patents. In the patent literature, U.S. Pat. Nos. 4,085,159 and 4,147,737 can in particular be mentioned. These polyesters are usually prepared from aromatic dicarboxylic acids, mainly terephthalic and isophthalic acid and optionally a minor proportion of aliphatic or cycloaliphatic dicarboxylic acids, and from various aliphatic polyols such as ethylene glycol, neopentyl glycol, 1,6-hexanediol, trimethylolpropane, and the like. These polyesters generally have an acid number of 15 to 100 mg of KOH/g of polyester. These polyesters based on aromatic dicarboxylic acids are most often used with triglycidyl isocyanurate as a cross-linking agent, and they provide thermosetting compositions which give paint or varnish coatings with good properties both as to their appearance and as to their mechanical properties (impact resistance, flexibility, etc.).

However, it has recently been found that the use of triglycidyl isocyanurate in powdered paints presents toxicity problems. For this reason, replacement of triglycidyl isocyanurate by less harmful cross-linking agents is now considered desirable.

These other cross-linking agents are of course expected to provide thermosetting compositions giving paint and varnish coatings having physical and chemical properties that are at least as good as, if not better than the properties of coatings obtained from thermosetting compositions based on triglycidyl isocyanurate and carboxyl group-containing polyesters.

Among the various cross-linking agents which can replace triglycidyl isocyanurate, glycidyl group-containing acrylic copolymers are of particular interest. As a matter of fact, coatings obtained from thermosetting powder compositions based on carboxyl group-containing polyesters and acrylic copolymers usually exhibit excellent weatherability. Unfortunately, the mechanical properties of coatings obtained from such compositions, such as for instance impact resistance, leave much to be desired.

U.S. Pat. No. 4,499,239 describes a thermosetting powder composition consisting essentially of 60 to 97% by weight of a linear polyester resin having an acid number of 15 to 200 mg of KOH/g, and 3 to 40% by weight of a glycidyl group-containing acrylic copolymer having a number-average molecular weighs of 300 to 5,000. The acid components used in the preparation of the polyester are known conventional carboxylic acids, such as terephthalic acid, isophthalic acid, adipic acid and trimellitic acid, and the alcohol components are conventional aliphatic diols, for example neopentyl glycol, ethylene glycol and 1,6-hexanediol.

The glycidyl group-containing acrylic copolymer preferably consists of 40 to 80% by weight of at least one (β-methyl)glycidyl (meth)acrylate and of 20 to 60% by weight of another vinyl monomer such as styrene or (meth)acrylic acid esters. The coatings obtained from the thermosetting compositions described in this patent have improved surface characteristics, notably a smooth glossy surface and outstanding weatherability. However, the mechanical properties of these coatings are insufficient; in the best case, the impact resistance does not exceed 50 kg.cm.

Therefore, there is still a need for thermosetting powder compositions which, contrary for example to the thermosetting powder composition disclosed in the above-cited U.S. Pat. No. 4,499,239 give coatings having good mechanical properties, whilst maintaining the excellent surface characteristics and weatherability already achieved and which do not make use of toxic cross-linking agents requiring care during handling, transportation and use.

We have now surprisingly found that thermosetting powder compositions which give paint and varnish coatings having markedly improved mechanical properties, as well as excellent weatherability, can be obtained from a carboxyl group-containing polyester and from an acrylic copolymer containing glycidyl groups as cross-linking agent, on the condition that the polyester has the following essential characteristics:

its preparation must take place in two steps, starting with the preparation of a hydroxyl group-containing polyester from at least one polycarboxylic acid other than 1,4-cyclohexanedicarboxylic acid, and from at least one polyol and following with the esterification of the hydroxyl groups of this polyester with 1,4-cyclohexanedicarboxylic acid exclusively;

its composition is very specific; i.e. its acid component must contain at least 75 mole % of terephthalic acid, at least 10 mole % of 1,4-cyclohexanedicarboxylic acid and at most 14 mole % of at least one other aromatic and/or aliphatic and/or icycloaliphatic polycarboxylic acid.

Thus, according to the present invention, there is provided a thermosetting powder compositions which comprises:

(a) a carboxyl-terminated polyester which
(1) has an acid number of 15 to 70 mg of KOH/g;
(2) is prepared in two steps, in the first of which a hydroxyl-terminated polyester is prepared from at least one polycarboxylic acid other than 1,4-cyclohexanedicarboxylic acid, and at least one aliphatic or cycloaliphatic polyol, and in the second step of which, the resulting hydroxyl-terminated polyester is esterified with 1,4-cyclohexanedicarboxylic acid exclusively; and
(3) comprises at least 75 mole % of terephthalic acid, at least 10 mole % of 1,4-cyclohexanedicarboxylic acid and at most 14 mole % of at least one other aromatic and/or aliphatic and/or cycloaliphatic polycarboxylic acid, based on a total carboxylic acid content of 100 mole %; and (b) a glycidyl group-containing acrylic copolymer.

The polyester (a) of the thermosetting compositions according to the invention is a carboxyl-terminated polyester having an acid number of 15 to 70 mg of KOH/g.

An essential characteristic of the carboxyl-terminated polyester (a) lies in its two-step synthesis. In the first step of this synthesis, a hydroxyl-terminated polyester, a major portion of which consists of terephthalic acid and of one or more aliphatic polyols, is prepared. In this first step, a minor amount of at least one other aromatic and/or aliphatic and/or cycloaliphatic polycarboxylic acid may optionally be added, but 1,4-cyclohexanedicarboxylic acid is not used.

In the second step of this synthesis, this hydroxyl-terminated polyester is reacted with 1,4-cyclohexanedicarboxylic acid as the sole acid.

However, among these polyesters, only those which have the required content of terephthalic acid and of 1,4-cyclohexanedicarboxylic acid are suitable for the purposes of the present invention.

This is why another essential characteristic of polyester (a) is that its acid component comprises at least 75 mole % of terephthalic acid, at least 10 mole % of 1,4-cyclohexanedicarboxylic acid and at most 14 mole % of at least one aromatic and/or aliphatic and/or cycloaliphatic polycarboxylic acid other than 1,4-cyclohexanedicarboxylic acid and terephthalic acid, based on a total carboxylic acid content of 100 mole %.

In a preferred embodiment of the invention, the carboxyl-terminated polyester (a) comprises 75 to 90 mole % of terephthalic acid and 10 to 25 mole % of 1,4-cyclohexanedicarboxylic acid, based on a the total carboxylic acid content of 100 mole %.

We have unexpectively found that in this manner a polyester with a 1,4-cyclohexanedicarboxylic acid-terminated chain is obtained which, when used together with a glycidyl group-containing acrylic copolymer, provides thermosetting powder compositions which give coatings having mechanical properties which are markedly superior to those obtained with the thermosetting powder compositions of the prior art, based on polyesters with isophthalic acid-, adipic acid- or maleic anhydride-terminated chains, such as described for example in U.S. Pat. No. 4,499,239.

The use of 1,4-cyclohexanedicarboxylic acid in the preparation of carboxyl group-containing polyesters used in the preparation of thermosetting powder compositions has already been proposed. For example, in European Pat. applications No. 389,926 and 522,648, powder paint compositions comprising a polyepoxy compound a polyester resin and customary additives are described; the polyester resin has an acid number ranging from 15 to 70 mg of KOH/g and a hydroxyl number lower than 10 mg of KOH/g, and is substantially based on units of dicarboxylic acids, glycols and monomers with a functionality of three or higher; as dicarboxylic acids, use is made of at least 15 mole % of isophthalic acid and at least 5 mole % 1,4-cyclohexanedicarboxylic acid based on a total dicarboxylic acid content of 100 mole %. In the European Pat. application No. 389,926 , very good results are reported for a polyester based on 45 to 65 mole % of terephthalic acid, 15 to 35 mole % of isophthalic acid and 15 to 30 mole % of 1,4-cyclohexanedicarboxylic acid. The polyepoxy compound used as cross-linking agent can be triglycidyl isocyanurate, diglycidyl terephthalate or its hexahydro derivative or a glycidyl group-containing acrylic copolymer. However, mention is made nowhere of the very specific polyester used according to the invention. Therefore, the advantages of the thermosetting powder composition of the present invention could not be revealed. Unlike the polyesters used in the aforementioned European Pat. applications, the specific carboxyl-terminated polyesters used according to the present invention have a polymer chain which is always terminated by 1,4-cyclohexanedicarboxylic acid, and the acid component must contain at least 75 mole % of terephthalic acid and at most 14 mole % of isophthalic acid. In fact, we have found that coatings with distinctly lower direct and reverse impact resistance are obtained when polyester (a) contains less than 75 mole % of telephthalic acid and more than 14 mole % of isophthalic acid based on a total carboxylic acid content of 100 mole % (see Example 16 below).

As indicated above, the preparation of the carboxyl-terminated polyester (a) should necessarily take place in two steps.

The acid component used to prepage the hydroxyl-terminated polyester in the first step consists mainly of terephthalic acid. According to the invention, it is absolutely necessary that the amount of terephthalic acid be at least 75 mole %, and preferably from 75 to 90 mole % of the total amount of carboxylic acids used in the composition of the carboxyl-terminated polyester (a). Other aromatic and/or aliphatic and/or cycloaliphatic polycarboxylic acids, excepting, however, 1,4-cyclohexanedicarboxylic acid, may optionally be used in the preparation of the hydroxyl-terminated polyester. Examples of such acids include succinic acid, glutaric acid, adipic acid, fumaric acid, maleic acid, isophthalic acid, 1,2-cyclohexanedicarboxylic acid, 1,3-cyclohexanedicarboxylic acid and the corresponding anhydrides thereof, alone or in admixture. Furthermore, to prepare branched-chain polyesters, tri- or polycarboxylic acids are advantageously used, such as for example trimellitic acid or anhydride, pyromellitic dianhydride, trimesic acid, pyromellitic acid, and the like. According to the invention however, the amount of these other polycarboxylic acids should not exceed 14 mole % of the total amount of carboxylic acids used in the composition of the carboxyl-terminated polyester (a).

The alcohol component used to prepare the hydroxyl-terminated polyester in the first step is a straight or branched-chain aliphatic polyol or a cycloaliphatic polyol having preferably 2 to 15 carbon atoms. These polyols may be selected from glycols or polyols such as ethylene glycol, diethylene glycol, 1,2-propanediol, 1,3-propanediol, 1,4-butanediol, 2-methyl-1,3-propanediol, neopentyl glycol, 1,5-pentanediol, 3-methyl-1,5-pentanediol, 2-butyl-2-ethyl-1, 3propanediol, 1,6-hexanediol, 1,4-cyclohexanedimethanol, 1,4-cyclohexanediol, neopentyl glycol hydroxypivalate and hydrogenated bisphenol A, alone or in admixture.

Furthermore, to prepare branched-chain polyesters, tri- or tetrahydric polyols are advantageously used, such as trimethylolpropane, ditrimethylolpropane, pentaerythritol, and the like.

Mixtures of neopentyl glycol and tri- and/or tetrahydric aliphatic polyols can be used according to the present invention; neopentyl glycol allows to obtain a suitable glass transition temperature and makes it easier to obtain a good melt viscosity whereas the tri- or tetrahydric polyol produces a polyester with a functionality higher than two.

The hydroxyl-terminated polyester is prepared by conventional methods. Generally, an excess of from 7 to 40 equivalent % of the alcohol component, with respect to the acid component, is used; a polyester with a hydroxyl number that may vary from 30 to 150 mg of KOH/g of polyester is thus obtained. The functionality of this polyester is preferably between 2 and 3.

According to the invention, the carboxyl-terminated polyester (a) is then prepared in the second step, by reacting the hydroxyl group-containing polyester obtained in the first step with 1,4-cyclohexanedicarboxylic acid; in general, this acid is present in the form of a mixture of cis and trans isomers.

The carboxyl-terminated polyester (a) is prepared using an excess of 1,4-cyclohexanedicarboxylic acid, with respect to the hydroxyl-terminated polyester; this excess is usually of from 10 to 60 equivalent %.

In order to obtain a polyester (a) having a 1,4-cyclohexanedicarboxylic acid-terminated chain, the amount of 1,4-cyclohexanedicarboxylic acid used has to be at least 10 mole %, preferably from 10 to 25 mole %, based on a the total carboxylic acid content of 100 mole % used in the composition of the carboxyl-terminated polyester (a).

Finally, a carboxyl-terminated polyester having an acid number of 15 to 70 mg of KOH/g of polyester is obtained. The functionality of this polyester is preferably between 2 and 3.

For the preparation of the polyesters, a conventional reactor equipped with a stirrer, an inert gas (nitrogen) inlet, a thermocouple, a distillation column connected to a water-cooled condenser, a water separator and a vacuum connection tube is used.

The esterification conditions used to prepare the polyesters are conventional, namely a standard esterification catalyst, such as dibutyltin oxide, dibutyltin dilaurate, n-butyltin trioctanoate, sulfuric acid or a sulfonic acid, can be used in an amount of from 0.05 to 0.5% by weight of the reactants and optionally, color stabilizers, for example, phenolic antioxidants such as IRGANOX 1010 (CIBA-GEIGY Corp.) or phosphonite- and phosphite-type stabilizers such as tributyl phosphite, can be added.

Polyesterification is generally carried out at a temperature which is gradually increased from 130° C. to about 190° to 250° C., first under normal pressure, then under reduced pressure at the end of each process step, while maintaining these operating conditions until a polyester is obtained, which has the desired hydroxyl and/or acid number. The degree of esterification is followed by determining the amount of water formed in the course of the reaction and the properties of the obtained polyester, for example the hydroxyl number, the acid number, the molecular weight or the viscosity.

When polyesterification is complete, cross-linking catalysts, which facilitate the reaction between the carboxyl groups of the polyester and the glycidyl groups of the acrylic copolymer, can optionally be added to the polyester while it is still in the molten state. These catalysts are added in order to accelerate cross-linking of the thermosetting powder composition during curing. Examples of such catalysts include amines (e.g. 2-phenylimidazoline), phosphines (e.g. triphenylphosphine), ammonium salts (e.g. tetrabutylammonium bromide or tetrapropylammonium chloride), and phosphonium salts (e.g. ethyltriphenylphosphonium bromide or benzyltriphenylphosphonium chloride). These catalysts are preferably used in an amount of 0 to 1% with respect to the weight of the polyester.

At the end of the synthesis, the carboxyl-terminated polyester is cast into a thick layer, allowed to cool and ground into particles having an average size of a fraction of a millimeter up to a few millimeters.

The carboxyl-terminated polyesters (a) suitable for use according to the invention are solid products which have a number-average molecular weight of 1,500 to 12,000, as determined by exclusion chromatography, using tetrahydrofuran as eluent. In the liquid state, these products have a viscosity of from 0,1 to 15 Pa.s., measured at 200° C. with a cone/plate viscosimeter (known as "ICI viscosity").

The glycidyl group-containing acrylic copolymer (b) of the thermosetting powder compositions according to the invention is obtained from glycidyl methacrylate and/or glycidyl acrylate, at least one (meth)acrylic monomer, and optionally an ethylenically monounsaturated monomer different from the glycidyl (meth)acrylate and the (meth)acrylic monomer.

The (meth)acrylic monomer is selected from the group consisting of the alkyl esters of an α,β-ethylenically unsaturated carboxylic acid having the formula

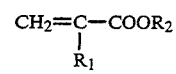

wherein
$R_1$ is a hydrogen atom or a methyl radical, and
$R_2$ represents an alkyl radical containing from 1 to 18 carbon atoms, and preferably 1 to 6 carbon atoms.

Examples of (meth)acrylic monomers include alkyl esters of acrylic acid or methacrylic acid such as ethyl acrylate, butyl acrylate, isobutyl acrylate, 2-ethylhexyl acrylate, and lauryl acrylate, methyl methacrylate, ethyl methacrylate, butyl methacrylate, isobutyl methacrylate and lauryl methacrylate.

The ethylenically monounsaturated monomer which can optionally be used is preferably selected from styrene, vinyltoluene, dimethylstyrene, α-methylstyrene, hydroxyethyl acrylate or methacrylate hydroxypropyl acrylate or methacrylate, acrylonitrile, acrylamide, vinyl acetate, etc. alone or as a mixture.

The glycidyl group-containing acrylic copolymers (b) suitable for use in the thermosetting powder compositions according to the present invention are preferably obtained from about 45 to 70% by weight of glycidyl methacrylate and/or glycidyl acrylate, about 5 to 55% by weight of the (meth)acrylic monomer and about 0 to 25% by weight of the other ethylenically monounsaturated monomer. These acrylic copolymers are prepared by known polymerization methods, such as polymerization in bulk, in emulsion, or in solution in an organic solvent. The monomers are copolymerized in the presence of a free-radical initiator such as benzoyl peroxide, tert-butyl peroxide, decanoyl peroxide, azo-bis-isobutyronitrile, and the like, in an amount of from 0.1 to 5% by weight of the monomers.

The preferred acrylic copolymers (b) have a number-average molecular weight ($\overline{Mn}$) (determined by exclusion chromatography using tetrahydrofuran as eluent), in the range of from about 2,000 to about 8,000. To achieve a good control of the molecular weight and its distribution, a chain transfer agent is added during polymerization, preferably one of the mercaptan type, Such as n-dodecylmercaptan, t-dodecanethiol, isooctylmercaptan, and the like, halides such as carbon tetrabromide, disulfides or thioethers. The chain transfer agent is used in an amount of from 0 to 10% by weight of the monomers used in the copolymerization. The acrylic copolymers preferably have an epoxy equivalent weight (EEW) of from 125 to 1,500, more preferably of from 200 to 1,100, and advantageously of from 200 to 600. The glass transition temperature ($T_g$) of these acrylic copolymers is in the range of 50° to 130° C., preferably of 50° to 85° C., determined according to ASTM D3418. An example of such a glycidyl group-containing acrylic copolymer is Estron 252, available from ESTRON CHEMICAL Inc.

The carboxyl-terminated polyester (a) and the glycidyl group-containing acrylic copolymer (b), together form the basic binder for the thermosetting powder compositions according to the invention especially useful as varnishes and paints, suitable for an application according to the coating technique by means of an electrostatic or a triboelectric spray gun, or for application according to the fluidized bed coating technique.

Thus, the present invention further relates to the use of the thermosetting compositions according to the invention to prepare powder varnishes and paints, as well as to the powder varnishes and paints obtained by means of these compositions.

The invention finally also relates to a process for coating an article, preferably a metal article, which comprises applying a thermosetting powder composition according to the invention to said article by spray coating with an electrostatic or a triboelectric spray gun or by coating from a fluidized bed, followed by curing the coating thus obtained at a temperature of from 150° to 200° C. for a period of about 10 to 30 minutes.

The glycidyl group-containing acrylic copolymer (b) may be used in an amount of from 1 to 4, preferably from 1.5 to 3 equivalents of epoxy groups per equivalent of carboxyl groups in the carboxyl-terminated polyester. The amount of acrylic copolymer (b) varies according to the nature of the copolymer and according to the acid number of polyester (a); the thermosetting powder compositions contain from 0.1 to 9, preferably from 1.5 to 4 parts by weight of polyester (a) per part by weight of acrylic copolymer (b).

The thermosetting powder compositions according to the invention may for example contain from about 10 to about 90%, preferably from 60 to 80% by weight of polyester (a) and from about 90 to about 10%, preferably from 40 to 20% by weight of acrylic copolymer (b) with respect to the total weight of polyester and acrylic copolymer.

The thermosetting powder compositions are prepared by homogeneously mixing the carboxyl-terminated polyester, the glycidyl group-containing acrylic copolymer and the various auxiliary substances conventionally used for the manufacture of powder paints and varnishes. This homogenization is carried out, for example, by melting the polyester, the acrylic copolymer and the various auxiliary substances at a temperature within the range of from 90° to 100° C., preferably in an extruder, for example a Buss-Ko-Kneter extruder or a twin-screw extruder of the Werner-Pfleiderer or APV type. The extrudate is then allowed to cool, is ground and sieved to obtain a powder, the particle size of which is between 10 to 110 micrometers.

The auxiliary substances which can be added to the thermosetting powder compositions according to the invention are, among others, ultraviolet absorbing compounds such as Tinuvin 900 (from CIBA-GEIGY Corp.), sterically hindered amine light stabilizers (for example Tinuvin 144 from CIBA-GEIGY Corp.), phenolic antioxidants (for example Irganox 1010 or Irgafos P-EPQ from CIBA-GEIGY Corp.) and stabilizers of the phosphonite or phosphite type. The compositions according to the invention may contain up to 10% by weight of such auxiliary substances, with respect to the weight of binder. Various pigments may also be added to the thermosetting compositions according to the invention. Examples of such pigments include metal oxides, such as titanium dioxide, iron oxide, zinc oxide, and the like, metal hydroxides, metal powders, sulfides, sulfates, carbonates, silicates, such as for example aluminum silicate, carbon black, talc, china clays, barytes, iron blues, lead blues, organic reds, organic maroons, and the like. Examples of further auxiliary agents include flow control agents such as Resiflow PV5 (from WORLEE), Modaflow (from MONSANTO), or Acronal 4F (from BASF), plasticizers such as dicyclohexyl phthalate, triphenyl phosphate, grinding aids, siccative oils, degassing agents such as benzoin, and fillers. These auxiliary substances are used in the usual amounts, it being understood that if the thermosetting compositions according to the invention are used as varnishes, opacifying auxiliary substances should be omitted.

The powder paints and varnishes which are the subject of the present invention are suitable to be applied on the articles to be coated by conventional methods, that is by application by means of an electrostatic or triboelectric spray gun or by the well-known fluidized bed coating technique.

After being applied to the article in question, the coatings are cured by heating in an oven at a temperature of from 150° to 200° C., for a period of about 10 to 30 minutes, in order to achieve complete cross-linking of the coating.

The following examples illustrate the invention without limiting it. In these examples, all parts are by weight, unless otherwise indicated.

In Tables I and II, the different compounds used for the preparation of the polyesters according to the invention and the polyesters used for comparison, are designated by the following abbreviations:

TPA: terephthalic acid
IPA: isophthalic acid

TMA: trimellitic anhydride
ADA: adipic acid
CHDA: 1,4-cyclohexanedicarboxylic acid
NPG: neopentyl glycol
TMP: trimethylolpropane
EG: ethylene glycol
HBPA: hydrogenated bisphenol A

EXAMPLE 1

Preparation of a Carboxyl-terminated Polyester

The preparation of these polyesters is carried out in two steps; in the first step, a hydroxyl-terminated polyester is prepared, and in the second step, this hydroxyl group-containing polyester is esterified with 1,4-cyclohexanedicarboxylic acid.

First step 428.5 parts of neopentyl glycol are introduced into a conventional reactor equipped with a stirrer, an inert gas (nitrogen) inlet, a thermocouple, an adiabatic column, a condenser, a water separator, and a vacuum connection tube. The mixture is heated at 130° C. until the glycol has melted, and then 616 parts of terephthalic acid, 2.3 parts of dibutyltin dilaurate as an esterification catalyst, and 1 part of tributyl phosphite as antioxidant, are added. The temperature of the reaction mixture is then increased to 225° C., and this temperature is maintained until 95% of the theoretical amount of water has separated by distillation, at which point a clear polyester with a hydroxyl number of 50 mg of KOH/g and an acid number of 3 mg of KOH/g is obtained.

Second step 100.5 parts of 1,4-cyclohexanedicarboxylic acid are then added to the reaction mixture. After reacting for 2 hours, the reactor is gradually placed under a reduced pressure of 50 mm Hg and the reaction is continued under reduced pressure until a polyester with the desired acid number is obtained.

The carboxyl-terminated polyester thus obtained, has the following characteristics:
  Acid number: 20 mg of KOH/g
  Functionality: 2
  $\overline{Mn}$ (number-average molecular weight): 5,600
  ICI viscosity at 200° C.: 12.5 Pa.s
  Reactivity at 180° C. (DIN 55,990-section 8) for a polyester/acrylic copolymer mixture (as described in Example 15(1)), in a weight ratio of 92:8: 80 seconds
  Color according to ASTM D2844 (Gardner): <1.

EXAMPLES 2 to 5

Preparation of Carboxyl-terminated Polyesters

Adopting the procedure described in Example 1, a series of other carboxyl-terminated polyesters are prepared (Examples 2 to 5). These different polyesters, along with the polyester of Example 1, are described in Table I, in which successively the following data are given: composition (in parts by weight) of the carboxyl-terminated polyester obtained in two steps, the acid number (AN), the functionality, the number-average molecular weight ($\overline{Mn}$), the ICI viscosity in Pa.s measured at 200° C., the color in Gardner scale and the reactivity at 180° C. (DIN 55,990-section 8) of the final polyester, the latter property being measured for a polyester/acrylic copolymer mixture (as described in Example 15(1)) in a weight ratio of 92:8 when the polyester has an acid number of about 20 mg of KOH/g, in a weight ratio of 88:12 when the polyester has an acid number of about 30 mg of KOH/g, and in a weight ratio of 82:18 when the polyester has an acid number of about 50 mg of KOH/g.

TABLE I

| | Examples of polyesters | | | | |
|---|---|---|---|---|---|
| | 1 | 2 | 3 | 4 | 5 |
| 1st step | | | | | |
| TPA | 616.1 | 606.4 | 562.7 | 565.9 | 542.0 |
| IPA | | | | | 75.3 |
| NPG | 428.5 | 421.8 | 407.9 | 382.4 | 420.6 |
| TMP | | | | 23.7 | |
| 2nd step | | | | | |
| CHDA | 100.5 | 114.7 | 167.6 | 167.8 | 104.4 |
| AN (mg of KOH/g) | 20 | 30 | 50 | 50 | 32 |
| Functionality | 2 | 2 | 2 | 2.5 | 2 |
| $\overline{Mn}$ | 5,600 | 3,750 | 2,250 | 2,800 | 3,500 |
| ICI viscosity at 200° C. (Pa.s) | 12.5 | 5.2 | 1.9 | 4.2 | 4.4 |
| Color (Gardner) | <1 | <1 | <1 | <1 | <1 |
| Reactivity at 180° C. (sec) | 80 | 70 | 42 | 34 | 75 |

EXAMPLES 6 to 14

(Comparative)

According to the procedure of Example 1, 9 other carboxyl-terminated polyesters have been prepared in two steps and are presented for comparative purposes.

Table II successively shows the composition (in parts by weight) of the carboxyl-terminated polyester prepared in two steps, the acid number (AN), the functionality, the number-average molecular weight ($\overline{Mn}$), the ICI viscosity in Pa.s measured at 200° C., the color in Gardner scale and the reactivity at 180° C. (DIN 55 990-section 8) of the final polyester, the latter property being measured for a polyester/acrylic copolymer mixture (as described in Example 15(1)) in a weight ratio of 92:8 when the polyester has an acid number of about 20 mg of KOH/g, in a weight ratio of 88:12 when the polyester has an acid number of about 30 mg of KOH/g, and in a weight ratio of 82:18 when the polyester has an acid number of about 50 mg of KOH/g.

The polyesters of Examples 6 to 11 do not contain 1,4-cyclohexanedicarboxylic acid. The polyesters of Examples 6 to 9, are prepared according to the procedure described in Example 1, except that in the second step, 1,4-cyclohexanedicarboxylic acid has been replaced by isophthalic acid (Examples 6 to 8) and by adipic acid (Example 9) respectively, while the polyesters of Examples 10 and 11 have compositions substantially identical to those of polyesters (A-1) and (A-2) respectively described in U.S. Pat. No. 4,499,239.

In the preparation of the polyesters of Examples 12 and 13, 1,4-cyclohexanedicarboxylic acid is used in the first step, either as the sole acid (Example 12), or together with terephthalic acid (Example 13), while 1,4-cyclohexanedicarboxylic acid is replaced by isophthalic acid in the second step.

Finally, the polyester of Example 14 is a carboxyl-terminated polyester prepared according to the procedure of Example 1, but the polyester contains 70.5 mole % of terephthalic acid (instead of 75.5 mole % as in Example 5), 15.5 mole % of isophthalic acid (instead of 10.5 mole % as in Example 5) and 14 mole % of 1,4-cyclohexanedicarboxylic acid, calculated with respect to the total amount of carboxylic acids used in its composition.

TABLE II

| | Examples of polyesters (for comparison) | | | | | | | | |
|---|---|---|---|---|---|---|---|---|---|
| | 6 | 7 | 8 | 9 | 10 | 11 | 12 | 13 | 14 |
| 1st step | | | | | | | | | |
| TPA | 618.9 | 566.7 | 569.5 | 626.4 | 628.9 | 419.9 | | 574.4 | 506.5 |
| IPA | | | | | | | | | 111.2 |
| CHDA | | | | | | | 450.6 | 37.4 | |
| ADA | | | | | 14.0 | | | | |
| NPG | 430.5 | 410.8 | 384.8 | 435.7 | 428.1 | 236.2 | 136.7 | 422.9 | 420.8 |
| EG | | | | | | 138.7 | | | |
| HBPA | | | | | | | 410.2 | | |
| TMP | | | | 23.8 | | | | | |
| 2nd step | | | | | | | | | |
| IPA | 97.3 | 162.5 | 162.5 | | | 365.0 | 111 | 108.3 | |
| ADA | | | | 86.3 | | | | | |
| TMA | | | | | 68.9 | | | | |
| CHDA | | | | | | | | | 104.5 |
| AN (mg of KOH/g) | 20 | 50 | 50 | 20 | 35 | 27 | 30 | 31.5 | 32.5 |
| Functionality | 2 | 2 | 2.5 | 2 | 3.1 | 2 | 2 | 2 | 2 |
| $\overline{M}n$ | 5,600 | 2,250 | 2,800 | 5,600 | 4,950 | 4,150 | 3,750 | 3,550 | 3,450 |
| ICI viscosity at 200° C. (Pa.s) | 14.5 | 2.2 | 5.5 | 6.3 | 8.6 | 9.8 | 4.0 | 6.2 | 4.3 |
| Color (Gardner) | <1 | 1 | 1 | 1 | 1 | 1 | <1 | <1 | <1 |
| Reactivity at 180° C. (sec) | 31 | 23 | 20 | 70 | 55 | 90 | 55 | 80 | 75 |

EXAMPLE 15

Preparation of Glycidyl Group-containing Acrylic Copolymers (1) 500 parts of ethyl acetate are introduced into a reactor equipped with a thermocouple, a stirrer, a reflux condenser and a dropping funnel. A mixture consisting of 284.5 parts of glycidyl methacrylate, 137.5 parts of methyl methacrylate, 100 parts of butyl acrylate, 22 parts of styrene, 30 parts of dodecylmercaptan and 10 parts of 2,2'-azobis(2-methylpropionitrile) is added over a period of one hour through the dropping funnel.

When the addition is complete, the reaction mixture is boiled under reflux for one hour. Then, 10 parts of 2,2-azobis(2'-methylpropionitrile) are added and the reaction mixture is kept under reflux for an additional two hours. The solvent is distilled off under reduced pressure and the glycidyl group-containing acrylic copolymer is collected.

The acrylic copolymer thus obtained is a solid product which is easily ground into a whitish powder. It has the following characteristics: ICI viscosity of 1.3 Pa.s, $\overline{M}n$ of 5,400 and an epoxy equivalent weight (EEW) of 250.

(2) In a similar way, an acrylic copolymer is prepared from a mixture of 262.9 parts of glycidyl methacrylate, 149.9 parts of methyl methacrylate, 104.0 parts of butyl acrylate and 27.2 parts of styrene.

The acrylic copolymer thus obtained has the following characteristics: ICI viscosity of 2.4 Pa.s, $\overline{M}n$ of 5,250 and an epoxy equivalent weight (EEW) of 300.

(3) In a similar way, an acrylic copolymer is prepared from a mixture of 147.8 parts of glycidyl methacrylate, 270.0 parts of methyl methacrylate, 103.5 parts of butyl acrylate and 22.8 parts of styrene.

The acrylic copolymer thus obtained has the following characteristics: ICI viscosity of 1.5 Pa.s, $\overline{M}n$ of 5,000 and an epoxy equivalent weight (EEW) of 550.

EXAMPLE 16

Preparation of Thermosetting Powder Compositions and Characteristics of the Paint Coatings Obtained from These Compositions Pigmented powders suitable for the production of coatings by spraying objects with an electrostatic spray gun are prepared according to the following formulation, i from the polyesters of Examples 1 to 5 (polyesters according to the invention) and from the comparative polyesters of Examples 6 to 14:

polyester: 502.5 parts
acrylic copolymer of Example 15(1): 167.5 parts
titanium dioxide (Kronos CL2310): 330.0 parts
flow control agent (Acronal 4F): 13.4 parts
benzoin : 10.0 parts These powders are prepared by mixing and homogenizing the various ingredients in an APV twin-screw extruder at a temperature of about 100° C. After cooling, the extrudate is ground in a pin-disc mill and sieved to yield a powder with a particle size of 10 to 110 micrometers.

The powders thus obtained are applied with an electrostatic spray gun onto mild steel panels, with a film thickness of 50 to 70 micrometers. Next, the deposited coatings are cured, either at 200° C. or at 180° C. for 12 minutes. The cured coatings thus obtained are then subjected to conventional tests. The results obtained for the polyesters of Examples 1 to 14 are given in Table III.

In Table III:
the 1st column gives the number of the example of the preparation of the polyester used in the tested formulation,
the 2nd column gives the thickness of the coating, in μm
the 3rd column gives the curing temperature in °C. (actual temperature of the article to be coated),
the 4th column gives the gloss value at an angle of 60°, in %, according to ASTM D 523,
the 5th column gives the behavior of the coating when submitted to bending on a conical mandrel of 3 mm, according to ASTM D 522,
the 6th column gives the value of the reverse impact resistance, in kg.cm, according to ASTM D 2794, the 7th column gives the value of the direct impact resistance, in kg.cm, according to ASTM D 2794, the 8th column gives the value obtained in the Erichsen embossing test, according to the ISO 1520 standard, the 9th column gives the number of days after which the gloss value, measured at an angle of 60° according to ASTM D 523, is no more than 50%, the coatings having been subjected to an accelerated ageing of 2 cycles a day in a Q-UV accelerated ageing apparatus (from the Q Panel Co), each cycle comprising a period of 8 hours of exposure to 4 UV lamps (UVB-313) at 60° C. in a dry atmosphere, followed by a period of 4 hours at 40° C. with the lamps switched off and under a relative humidity of 100%, according to ASTM 53-88.

TABLE III

| Polyester of Example No. | Thickness (μm) | Curing temperature (°C.) | Gloss at 60° (%) | Conical mandrel | Reverse impact (kg · cm) | Direct impact (kg · cm) | Erichsen embossing (mm) | Q-UV (days) |
|---|---|---|---|---|---|---|---|---|
| 1 | 65 | 200 | 90 | pass | 80 | 80 | 9.2 | 18 |
| 2 | 63 | 200 | 90 | pass | 80 | 80 | 9.4 | 17 |
| 3 | 60 | 200 | 92 | pass | 80 | 80 | 9.3 | 19 |
| 4 | 68 | 180 | 91 | pass | 80 | 80 | 9.0 | 16 |
| 5 | 65 | 200 | 90 | pass | 80 | 80 | 9.4 | 20 |
| 6 (1) | 60 | 200 | 89 | — | 0 | 0 | 0.5 | 13 |
| 7 (1) | 59 | 200 | 92 | pass | 0 | 0 | 1.0 | 15 |
| 8 (1) | 63 | 200 | 91 | — | 0 | 0 | 0.3 | 12 |
| 9 (1) | 67 | 200 | 88 | pass | 20 | 0 | 3.0 | 14 |
| 10 (1) | 66 | 200 | 90 | — | <20 | <20 | 2.5 | 15 |
| 11 (1) | 63 | 200 | 89 | — | <20 | <20 | 0.3 | 9 |
| 12 (1) | 62 | 200 | 91 | pass | 0 | 0 | 2.5 | 11 |
| 13 (1) | 64 | 200 | 89 | pass | 20 | 20 | 7.8 | 16 |
| 14 (1) | 65 | 200 | 87 | pass | 20 | 40 | 8.3 | 15 |

(1) for comparative purposes

The results in Table III show that only the thermosetting powder compositions prepared according to the invention (polyesters of Examples 1 to 5) give coatings with a high gloss excellent mechanical properties and at the same time good weatherability. Indeed, powder compositions containing polyesters which are not according to the invention give coatings with markedly inferior mechanical properties.

For example, it can be seen that replacement of 1,4-cyclohexanedicarboxylic acid by isophthalic acid (Examples 6 to 8) or by adipic acid (Example 9) in the second step of the polyester preparation gives truly poor results in the impact resistance test and in the Erichsen embossing test. The same applies to compositions containing the polyesters of Examples 10 and 11 the compositions of which are very similar to those of the polyesters of U.S. Pat. No. 4,499,239.

The results also show that it is not possible to obtain good impact resistance with polyesters in which 1,4-cyclohexanedicarboxylic acid is used in the first step of the synthesis and not in the second step (see polyesters of Examples 12 and 13).

Finally, it can be seen that the polyester cannot contain less than 75 mole % of terephthalic acid and more than 14 mole % of isophthalic acid with respect to the total amount of carboxylic acids used in its composition, since the gradual replacement of increasing amounts of terephthalic acid by isophthalic acid gives coatings having a direct and reverse impact resistance which is clearly inferior (compare the results in the impact resistance test obtained with the polyester of Example 14, which contains 70.5 mole % of terephthalic acrid, with those obtained with the polyester of Example 5, which contains 75.5 mole % of terephthalic acid).

EXAMPLE 17

Thermosetting powder compositions A and B, the formulations of which are given below, are prepared according to the procedure of Example 16 from the polyester of Example 3 prepared according to the invention and from the acrylic copolymers of Example 15(2) and of Example 15(3).

|  | Composition (parts by weight) | |
|---|---|---|
|  | A | B |
| polyester of Example 3 | 469 | 402 |
| acrylic copolymer of Example 15(2) | 201 | |
| acrylic copolymer of Example 15(3) | | 268 |
| titanium dioxide (Kronos CL2310) | 330.0 | 330.0 |
| flow control agent (Acronal 4F) | 13.4 | 13.4 |
| benzoin | 10.0 | 10.0 |

Table IV gives the characteristic B of the coatings obtained from compositions A and B under the same conditions as in Example 16, and tested on mild steel panels.

TABLE IV

| Characteristics of the paint coatings | | |
|---|---|---|
|  | Powder composition | |
|  | A | B |
| Thickness (μm) | 65 | 60 |
| Curing temperature (°C.) | 200 | 200 |
| Gloss at 60° (%) | 91 | 90 |
| Conical mandrel | pass | pass |
| Reverse impact (kg · cm) | 80 | 80 |
| Direct impact (kg · cm) | 80 | 80 |
| Erichsen embossing (mm) | 9.2 | 9 |
| Q-UV (days) | 19 | 21 |

What is claimed is:

1. A thermosetting powder composition which comprises:
    (a) a carboxyl-terminated polyester which
    (1) has an acid number of 15 to 70 mg of KOH/g;
    (2) is prepared in two steps, in the first of which a hydroxyl-terminated polyester is prepared from at least one polycarboxylic acid other than 1,4-cyclohexanedicarboxylic acid and at least one aliphatic or cycloaliphatic polyol, and in the second step of which, the resulting hydroxyl-terminated polyester is esterified with 1,4-cyclohexanedicarboxylic acid exclusively; and (3) comprises at least 75 mole % of terephthalic acid, at least 10 mole % of 1,4-cyclohexanedicarboxylic acid and most 14 mole % of at least one other aromatic and/or aliphatic and/or cycloaliphatic polycarboxylic acid, based on a total carboxylic acid content of 100 mole %; and (b) a glycidyl group-containing acrylic copolymer.

2. The composition of claim 1, wherein the carboxyl-terminated polyester (a) has a number-average molecular weight of 1,500 to 12,000.

3. The composition of claim 1, wherein the carboxyl-terminated polyester (a) comprises 75 to 90 mole % of terephthalic acid and 10 to 25 mole % of 1,4-cyclohexanedicarboxylic acid, based on a total carboxylic acid content of 100 mole %.

4. The composition of claim 1, wherein the carboxyl-terminated polyester (a) comprises up to 14 mole % of at least one aromatic and/or aliphatic and/or cycloaliphatic polycarboxylic acid selected from the group consisting of succinic acid, glutaric acid, adipic acid, fumaric acid, maleic acid isophthalic acid, 1,2-cyclohexanedicarboxylic acid, 1,3-cyclohexanedicarboxylic acid, trimellitic acid, pyromellitic acid, trimesic acid and the corresponding anhydrides thereof.

5. The composition of claim 1, wherein 2the alcohol component of the polyester (a) is a cycloaliphatic or aliphatic polyol selected from the group consisting of ethylene glycol diethylene glycol, 1,2-propanediol, 1,3-propanediol, 1,4-butanediol, 2-methyl-1,3-propanediol, neopentyl glycol, 1,5-pentanediol, 3-methyl-1,5-pentanediol, 2-butyl-2-ethyl-1,3-propanediol, 1,6-hexanediol, 1,4-cyclohexanedimethanol, 1,4-cyclohexanediol, neopentyl glycol hydroxypivalate, hydrogenated bisphenol A, trimethylolpropane, ditrimethylolpropane, pentaerythritol and mixtures thereof.

6. The composition of claim 1, wherein the glycidyl group-containing acrylic copolymer (b) is formed from glycidyl methacrylate and/or glycidyl acrylate, at least one alkyl acrylate or methacrylate in which the alkyl radical contains from 1 to 18 carbon atoms and optionally an ethylenically monounsaturated monomer different from the glycicyl (meth)acrylate and the alkyl (meth)acrylate.

7. The composition of claim 6 wherein the ethylenically mono-unsaturated monomer is selected from the group consisting of styrene, vinyltoluene, dimethylstyrene, α-methylstyrene, hydroxyethyl acrylate or methacrylate, hydroxypropyl acrylate or methacrylate, acrylonitrile, acrylamide, vinyl acetate and mixtures thereof.

8. The composition of claim 1, wherein the glycidyl group-containing acrylic copolymer (b) is formed from about 45 to 70% by weight of glycidyl methacrylate and/or glycidyl acrylate, about 5 to 55% by weight of at least one alkyl acrylate or methacrylate and about 0 to 25% by weight of ethylenically monounsaturated monomer, different from the glycidyl (meth)acrylate and the alkyl (meth) acrylate.

9. The composition of claim 1, wherein, the glycidyl group-containing acrylic copolymer (b) has a number-average molecular weight in the range of from about 2,000 to about 8,000, and an epoxy equivalent weight of from 125 to 1,500.

10. The composition of claim 9, wherein the glycidyl group-containing acrylic copolymer has an epoxy equivalent weight of from 200 to 1,100.

11. The composition of claim 1, wherein the weight ratio of carboxyl-terminated polyester (a) to glycidyl, group-containing acrylic copolymer (b) is 0.1 to 9 parts by weight of polyester (a) per part by weight of acrylic copolymer (b).

12. The composition of claim 11, wherein the weight ratio of carboxyl-terminated polyester (a) to glycidyl group-containing acrylic copolymer (b) is 1.5 to 4 parts by weight of polyester (a) per part by weight of acrylic copolymer (b).

13. The composition of claim 1, comprising from about 10% to about 90% by weight of polyester (a) and from about 90% to about 10% by weight of acrylic copolymer (b), with respect the total weight of polyester and acrylic copolymer.

14. The composition of claim 13, comprising from 60 to 80% by weight of polyester (a) and from 40 to 20% by weight of acrylic copolymer (b), with respect to the total weight of polyester and acrylic copolymer.

15. A varnish or paint comprising a thermosetting powder composition as claimed in claim 1.

16. A process for coating an article, which comprises applying a thermosetting powder composition of claim 1 to said article by spray coating with an electrostatic or a triboelectric spray gun or by coating from a fluidized bed and curing the coating thus obtained at a temperature of from 150° to 200° C. for a period of about 10 to 30 minutes.

17. An article entirely or partially coated by means of the process of claim 16.

* * * * *